United States Patent [19]

Oetiker

[11] Patent Number: 4,693,502
[45] Date of Patent: Sep. 15, 1987

[54] PIPE CONNECTION

[76] Inventor: Hans Oetiker, Oberdorfstrasse 21, 8810 Horgen, Switzerland

[21] Appl. No.: 860,422

[22] Filed: May 7, 1986

Related U.S. Application Data

[60] Division of Ser. No. 815,371, Jul. 13, 1977, which is a continuation-in-part of Ser. No. 531,793, Dec. 11, 1974, abandoned, which is a continuation-in-part of Ser. No. 387,446, Aug. 10, 1973, abandoned.

[30] Foreign Application Priority Data

Aug. 10, 1972 [CH] Switzerland ............... 11836/72

[51] Int. Cl.⁴ ............................ F16L 25/00
[52] U.S. Cl. .................. 285/334.5; 285/39; 285/365; 285/371; 285/382; 285/901; 285/906; 285/915; 138/89
[58] Field of Search ............... 285/332.3, 334.5, 372, 285/364–367, 397–398, 370–371, 406–411, 901, 906, 915, 39, 382; 138/89; 24/20 CW, 279

[56] References Cited

U.S. PATENT DOCUMENTS

| | | | |
|---|---|---|---|
| 1,277,076 | 8/1918 | Ireland | 24/20 R |
| 1,825,062 | 9/1931 | Heaton et al. | 285/292 |
| 1,937,881 | 12/1933 | Fisher | 285/367 X |
| 2,601,172 | 6/1952 | Sebok | 285/367 |
| 2,614,304 | 11/1952 | Oetiker | 24/20 C W |
| 2,635,900 | 4/1953 | Mayo et al. | 285/334.2 |
| 2,649,632 | 8/1953 | Kessler | 24/270 |
| 2,663,582 | 12/1953 | Sebok | 285/334.5 |
| 2,670,799 | 3/1954 | Dobbs | 138/89 |
| 2,941,823 | 6/1960 | Good | 285/408 |
| 3,087,221 | 4/1963 | Armstrong | 24/20 C W |
| 3,499,667 | 3/1970 | Pfeuffer | 285/365 X |
| 3,851,902 | 12/1974 | Robinson | 285/334.2 |
| 3,869,944 | 3/1975 | Oetiker | 24/20 C W |

FOREIGN PATENT DOCUMENTS

| | | | |
|---|---|---|---|
| 163098 | 5/1949 | Fed. Rep. of Germany | 285/242 |
| 1231977 | 1/1967 | Fed. Rep. of Germany | 285/367 |
| 263468 | 7/1968 | Fed. Rep. of Germany | . |
| 813192 | 2/1937 | France | 285/365 |
| 1016629 | 9/1952 | France | 285/367 |
| 1473759 | 3/1967 | France | 285/367 |
| 43424 | 6/1938 | Netherlands | 285/367 |
| 218292 | 1/1968 | Sweden | 24/20 CW |
| 42094 | 9/1967 | Switzerland | 285/367 |
| 543529 | 3/1942 | United Kingdom | 285/367 |
| 977205 | 5/1962 | United Kingdom | 285/365 |
| 946187 | 1/1964 | United Kingdom | 285/367 |
| 1065634 | 4/1967 | United Kingdom | 24/20 CW |

Primary Examiner—Dave W. Arola
Attorney, Agent, or Firm—Paul M. Craig, Jr.

[57] ABSTRACT

A pipe connection in which pipe ends are provided with lips or flarings within the area of the joint edges and which includes a clamping ring having a U-shaped profile at the inner surface which is adapted to be tightened radially inwardly; the inner end faces of the clamping ring and/or the end faces of the lips or flarings are inclined toward the pipe axis so that the joining edges are urged toward one another in the tightened condition of the clamping ring; at least the radially outermost ring-shaped part of the clamping ring is provided with at least one plastically deformable, lug-shaped ear which is adapted to be tightened by contraction thereof and thereby establishes a permanent connection which can be reopened only by destruction of the clamping ring.

26 Claims, 16 Drawing Figures

PIPE CONNECTION

The present application is a divisional application of my prior copending application Ser. No. 815,371, filed on July 13, 1977, which itself is a continuation-in-part application of the then copending application Ser. No. 531,793, now abandoned, filed in U.S. Patent and Trademark Office on Dec. 11, 1974 as a continuation-in-part application of the then copending application Ser. No. 387,446, now abandoned filed in the U.S. Patent and Trademark Office on Aug. 10, 1973, and claiming the right of priority of the Swiss application 11836/72 of Aug. 10, 1972, the right of which is also claimed herein.

The present invention relates to a pipe or tube connection in which pipe or tube ends are provided with lips or flarings, especially with axially symmetrical lips or flarings in the joining area and which comprises a radially inwardly lockable clamping ring having a U-shaped profile at the internal surface, whereby the internal faces of the clamping ring and/or the end faces of the lips or flarings facing away from the joint, are bevelled off or are inclined toward the pipe axis, so that, in the locked condition of the clamping ring, the joining edges of the pipe or tube ends are urged and pressed toward each other.

Various pipe connections with clamping members are known in the prior art, in which flared ends are held together by various locking devices. For example, in one such prior art construction individual segments of the clamping member are locked together by tangential bolts. Such constructions are not only expensive to manufacture but also involve either expensive wing nuts requiring much space for the tightening operation or a special-purpose tool. Another type of construction which is neither equipped with a lever lock nor with a screw closure, is suitable only for very small internal pressures, if at all.

All of these as well as other prior art pipe or tube couplings are not only complicated in structure, thereby involving relatively high manufacturing costs, but more importantly fail to provide a permanent connection which is completely safe against unintentional subsequent reopening or release. For example, the U.S. Pat. No. 2,941,823 discloses a W-band coupling for flanged pipes which not only requires relatively complex parts, costly to manufacture, but utilizes a T-bolt for drawing together the coupling which basically is tightened to one dimension and which may become loose as a result of thermal fluctuations or pressure fluctuations. The same drawbacks are encountered with the coupling disclosed in the British Pat. No. 977,205 which requires two clamping rings hinged together and adapted to be closed by a toggle device. Apart from the fact that the coupling of this British patent is suitable for parts of only one specific dimension, it additionally entails problems not only due to inadvertent release of the toggle device, for example, when actuated by the clothing of a person inadvertently coming in contact with the same, but also due to a possible unintentional loosening as a result of temperature variations causing thermal expansion. The U.S. Pat. No. 3,499,667 discloses a hose clamp for connecting the ends of heavy-duty hoses and for that purpose also utilizes parts which are mechanically interlocked thereby entailing the same problems as the other aforementioned prior art devices.

The present invention seeks to avoid the aforementioned disadvantages and to provide a very inexpensive pipe connection which can be permanently established by the use of a very simple tool and which also is able to withstand high pressures, temperatures fluctuations as well as pressure fluctuations without the danger of developing undesired leaks.

Additionally, the present invention seeks to provide a pipe or tube connection which is permanent in nature and cannot be inadvertently reopened but instead requires a conscious intentional destruction of a part thereof that otherwise remains firmly seated on and causes a permanent fluidtight connection of the pipe or tube parts. Moreover, the pipe or tube coupling of the present invention is to be such that it can be used with parts that need not be manufactured to precise tolerances and at the same time is able to automatically compensate for thermal expansions and/or pressure increases or repeated pressure fluctuations in the parts of the pipe or tube coupling without the danger of developing any leaks as a result thereof. These features are of the utmost importance where the pipe or tube coupling is used to connect, for example, copper tubing sections in homes or buildings, carrying water or gas. Similarly, these features are also prerequisites in industrial applications utilizing stainless steel or similar pipes, such as for connections in the exhaust gas systems of motor vehicles where long service life together with complete gas-tightness at relatively high operating temperatures are absolutely necessary for the protection of the user of the motor vehicle.

For this purpose, a pipe or tube connection in accordance with the present invention is constructed in such a manner that at least the radially outermost, annular portion of the clamping ring which is itself of approximately U-shaped cross section, is provided with at least one substantially plastically deformable lug-shaped ear of known construction which, upon contraction, causes the tightening of the ring and establishes the permanent pipe or tube connection.

Such types of rings, though of different construction as regards the cross sectional shape thereof, have been used as hose clamps, and more particularly in the form of closed rings or open rings with a completely flat configuration in the axial direction, which can be closed by hooks or barbs engaging in perforations, and which include one or several plastically deformable lug-shaped ears which can also be contracted with the use of very simple tools, such as a pair of pincers, whereby the ring is tightened.

The clamping rings of the pipe of tube coupling of the present invention, though of different construction from these prior art hose clamps, nonetheless not only permit also their use and completely satisfactory installation with parts of relatively widely differing external diametric dimensions, but also provide an automatic compensation for slight changes in the diametric dimensions of the parts once installed, which are caused, for example, by thermal expansions and/or pressure fluctuations of the medium flowing through the connection, to thereby maintain a completely fluid-tight connection by the inherent characteristics of the lug-shaped ears in their relationship to the rings, which due to their plastic deformation seek to maintain the rings in the contracted condition owing to the elastic forces produced in such a structure.

One obtains with clamping rings, applied according to the present invention, a very inexpensive yet at the same time very dependable pipe or tube connection which can be realized and established with simplest possible tools.

In one embodiment of this invention, the clamping ring is preferably provided with a ring having a U-shaped profile substantially over the entire internal surface thereof. This type of construction is unitary, i.e., in one-piece and is characterized by utmost inexpensiveness. Added thereto is the fact that a larger deformation effort is required for the contraction of the lug-shaped or ear having a U-shaped profile of the internal surface than for a ring having a cylindrical internal surface, whereby also the resistance of the material to expansion or reopening of the ear is correspondingly greater, whence this type of construction presses the joining edges of the pipe or tube ends together with extra reliability and forcefulness.

According to another embodiment a short section of a pipe piece which abuts flush against the inner surfaces of the pipe or tube ends and which axially overlaps the joint area may be provided on the inside of the pipe ends, whereby an annular seal arranged between the joining edges and surrounding the short piece of pipe is provided, and whereby the ear of the ring of such embodiment is preferably provided with a notch or groove within the area of its apex. On the one hand, a reliable axial alignment of the pipe ends is assured in this manner and, on the other, the seal is reliably held in its radial position between the joining edges of the pipe ends and thereby ensures that the ear does not fold up when being contracted, so that only the material in the area of the leg portion of the ear is being deformed during contraction. This ensures a secure and reliable contracted condition of the ring, capable of elastically absorbing also a diameter change of the pipe ends, as under temperature effects.

The notch or groove thereby presents a circular or elliptical form extending in the direction of the ring circumference. This type of construction results in an especially stable apex of the ear.

If the inner diameter of the pipe is not to be reduced by the presence of the short pipe section, it is possible, according to another feature of the present invention, to flare the ends of the pipes or tubes to receive a short pipe section with the same inner diameter as the normal diameter of the pipes.

Moreover, in case of high temperature applications, high temperature seals in the form of flat gaskets of suitable high heat-resistant material such as asbestos are used which are inserted between the flared surfaces of the outer ends of the pipes and a bead having similarly shaped wall portions formed in the short pipe section.

In still another embodiment, one of the pipe ends itself may be provided with such a bead near its free end while the other pipe end is then suitably flared over a predetermined axial length to receive in its widened portion the normal pipe end of the one pipe and is additionally flared at the free pipe end of its widened portion to enable the formation of the pipe coupling by means of the clamping ring in cooperation with the bead.

In still a further embodiment according to the present invention one pipe end may also be so deformed as to eliminate the need for a separate pipe or tube insert section.

Accordingly, it is an object of the present invention to provide a pipe or tube connection which avoids by simple means the aforementioned shortcomings and drawbacks encountered in the prior art.

Another object of the present invention resides in a pipe connection which is relatively inexpensive to manufacture, obviates the need for tightening elements requiring a relatively large amount of space and eliminates the need for special tools.

A further object of the present invention resides in a pipe connection of the type described above which is able to withstand relatively high internal pressures, notwithstanding its simple construction.

Still a further object of the present invention resides in a pipe or tube connection which can be readily established with the use of extremely simple tools.

Another object of the present invention resides in a simple pipe or tube connection which assures a reliable and strong mutual abutment of the joining edges of the pipe ends, thereby assuring a fluid-tight connection of permanent nature.

Still a further object of the present invention resides in a tubing connection which is simple in construction and inexpensive in manufacture, yet assures a reliable axial alignment of the pipe ends as well as an operationally reliable seal in the joint area.

A still further object of the present invention resides in a pipe or tube connection of the type described above which is able to elastically absorb also diameter changes of the pipe ends caused, for example, by temperature fluctuations.

These and further objects, features and advantages of the present invention will become more apparent from the following description when taken in connection with the accompanying drawings which show, for purposes of illustration only, several embodiments in accordance with the present invention, and wherein:

FIG. 2 is a cross-sectional view taken along line I—I of FIG. 1;

Figures 1, 2, 3, 4, 5:
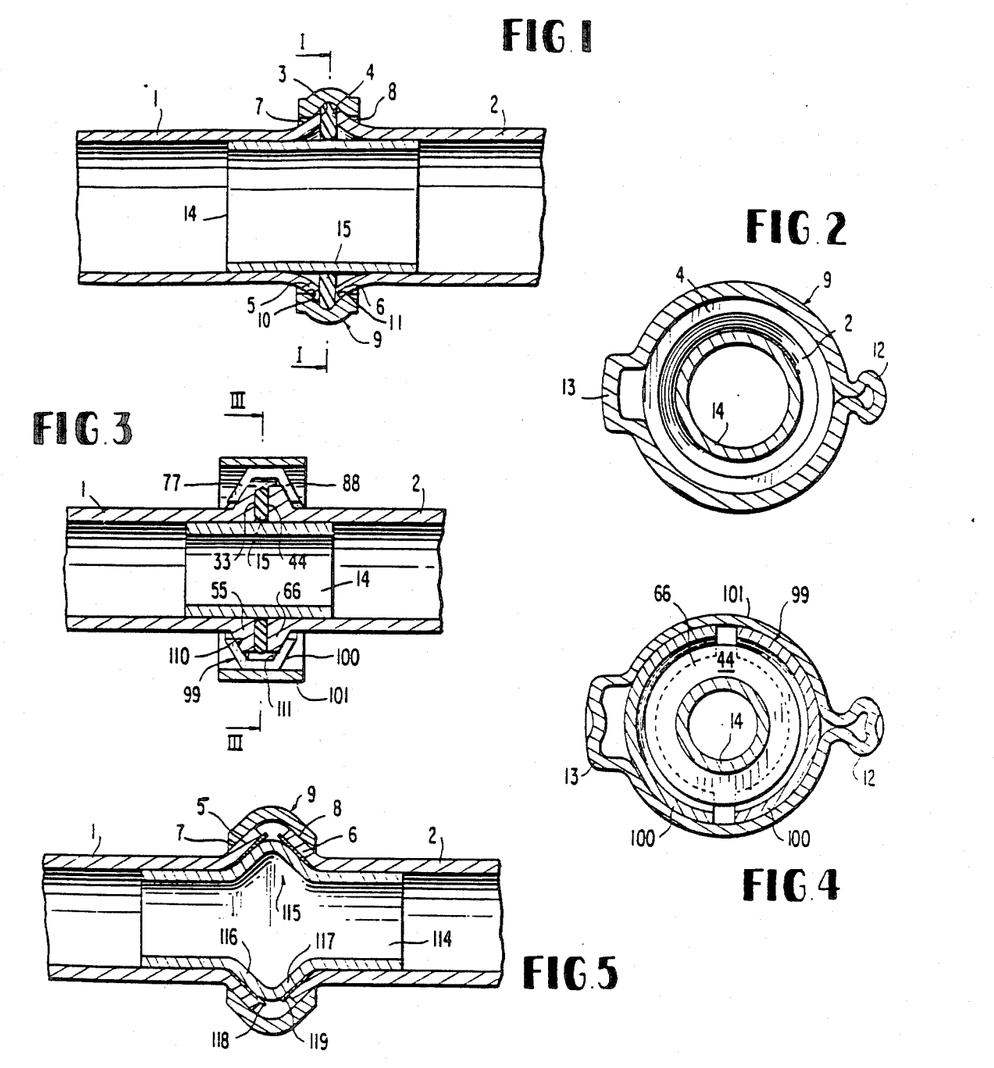
FIG. 1 is an axial cross-sectional view through a pipe connection according to the present invention.
FIG. 3 is an axial cross-sectional view through another embodiment of a pipe connection in accordance with the present invention.
FIG. 4 is a cross-sectional view taken along line III-—III in FIG. 3.
FIG. 5 is a cross-sectional view through a pipe connection according to the present invention for applications under extreme temperatures with a beaded pipe insert section and with two flat high heat-resistant seals.

Referring now to the drawing wherein corresponding parts are designated by the same reference numerals throughout the various views, and more particularly to FIG. 1, this figure illustrates the pipe ends 1 and 2, which are provided with axially symmetrical lips or flarings 5, 6 within the area of their joining edges 3, 4. In the illustrated embodiment, the lips or flarings 5, 6 are constructed as trumpet-shaped enlargements of the pipe ends which are formed by flaring the pipe ends by conventional means. The surfaces 7, 8 of the lips 5, 6 opposite the joining edges 3, 4 are inclined with respect to the pipe axis. A clamping ring generally designated by reference numeral 9 having an approximately U-shaped profile of its internal surface (FIG. 1) is adapted to be tightened by contraction in the radially inward direction. Its internal flanks 10, 11 are also inclined with respect to the pipe axis, so that, in the tightened condition of the clamping ring 9, the joining edges 3, 4 of the pipe ends 1, 2 are urged toward each other. It would be sufficient as such, if only the lip faces 7 and 8 facing away from the joining edges 3 and 4 or if only the internal faces 10 and 11 of the clamping ring 9 were inclined with respect to the pipe axis; however, establishing the pipe connection is considerably facilitated if both mentioned faces are constructed so as to be inclined to the pipe axis.

The clamping ring 9 is constituted by a ring which is provided with two plastically deformable lug-shaped ears 12, 13 capable of being contracted for the purpose of tightening the ring. In the illustrated embodiment only the ear 12 is already contracted, so that the clamping ring 9 is not yet fully tightened. Only after the ear 13 is also contracted, either with an ordinary pair of pincers or, in an assembly line production, with pneumatic pliers, will the clamping ring 9 be completely tightened. It can be seen from FIG. 1 that the ring 9 has a convex external surface. For this reason, the pair of pincers, by means of which the ring is tightened, is preferably provided with corresponding recesses in its jaws.

A short pipe insert section 14 is arranged on the inside of the pipe ends 1, 2 which axially overlaps the joining edges 3, 4 and rests snugly against the internal surfaces of the pipe ends. An annular seal 15 is arranged between the joining edges 3, 4 which surrounds the pipe insert section 14.

In the pipe connection according to FIG. 3, the pipe ends 1, 2 are provided within the area of their joining edges 33, 44 with lips 55, 66 in the form of ring flanges which are integral with the pipe ends. The faces 77, 88 opposite, i.e., facing away from the joining edges 33, 44 are also inclined to the pipe axis.

The internal radial portion of the clamping ring generally designated by reference numeral 99 is formed by two ring segments 100 having a U-shaped profile at the internal surfaces thereof and cylindrical-conical external surfaces, while the external radial portion of the clamping ring 99 is formed by a ring-like clamping member 101 which is again provided with two plastically deformable lug-shaped ears 12, 13. The internal end faces 110, 111 of the ring segments 100 are inclined with respect to the pipe axis, corresponding to the end faces 77, 88 of the lips 55, 66 facing away from the joining edges 33, 44. Instead of having a single ring 101, it is also possible to use several rings, which are then arranged in the axial direction of the pipe symmetrically with respect to the joining edges 33, 44. It is expedient at any rate to provide the edges or end faces of the ring segments 100 with flanges to prevent the ring or rings 101 having cylindrical internal surfaces from slipping off.

The lug-shaped ears 12, 13 are each provided within the area of their apices with a circular or indentation or groove 16 having an elliptical form extending in the direction of the circumference of the ring which serve to stiffen and reinforce the apex portion of the ears 12, 13.

The insertion of the short pipe insert section 14 is not absolutely necessary, depending on the prevailing conditions. Furthermore, in certain applications the seal 15 can be omitted and a sufficient sealing action is obtained, with a pipe insert section 14 by the use of a conventional self-drying sealer, such as "Loktite" which is then smeared about the ends of the pipe insert 14 and will provide a seal once the pipe sections 1 and 2 are emplaced and the sealer has dried. Additionally, even a commercial paint can be used in some cases in lieu of a sealer.

FIG. 5 illustrates an embodiment of a pipe connection according to the present invention which can be used for special applications under extreme heat or temperatures. This embodiment differs from FIG. 1 in that the short pipe insert section 114 includes a more or less centrally arranged bead generally designated by reference numeral 115 which is defined by inclined wall portions 116 and 117 formed by conventional means in the tube section 114. The wall portions 116 and 117 are thereby inclined to the pipe axis at an angle substantially similar to the angle of inclination of the flared lips 5 and 6. Flat gasket-like seals 118 and 119 made of high heat-resistant material such as asbestos are placed between the external surfaces of wall portions 116 and 117 and the internal surfaces of the flared lips 5 and 6. As to the rest, the arrangement of FIG. 5 is similar to that of FIG. 1, but provides a stronger mechanical connection than the construction of FIG. 1. Moreover, this arrangement can also be used for relatively high temperature applications without any seals. For lower temperature applications, either rubber or Teflon gaskets may also be used or Teflon tape may be wrapped around the bead 115. However, the gasket-like seals 118 and 119 may also be chosen from any material suitable for a given application to be compatible with the gas or liquid to be carried by the pipe system, for example, to comply with FDA regulations.

Figure 6:
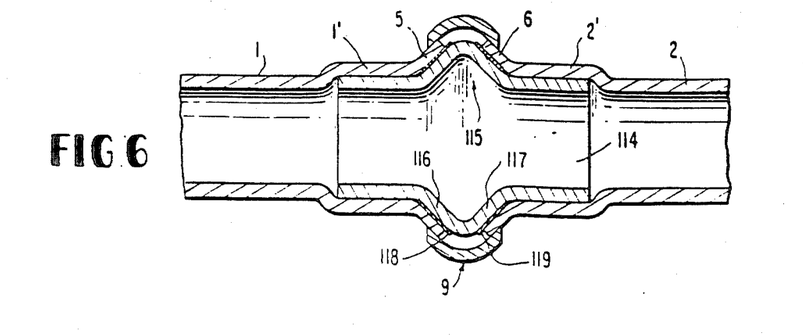
FIG. 6 is a cross-sectional view through a modified embodiment of a pipe connection in accordance with the present invention, similar to FIG. 5, in which the ends of the pipes are flared over predetermined axial lengths to receive within the widened portions a short pipe insert section with an inner diameter corresponding to the full normal inside diameter of the selected tubing.

The embodiment of FIG. 6 differs from that of FIG. 5 merely in that the pipes 1 and 2 are flared over predetermined axial lengths to form widened portions 1' and 2' to receive a short pipe insert section 114 which has the same internal diametric dimension as the normal inside diametric dimension of the used pipes or tubes 1 and 2. Flow losses or restrictions are avoided in this manner in the pipe connection according to the present invention.

Figures 7, 8, 9, 10, 11, 12:
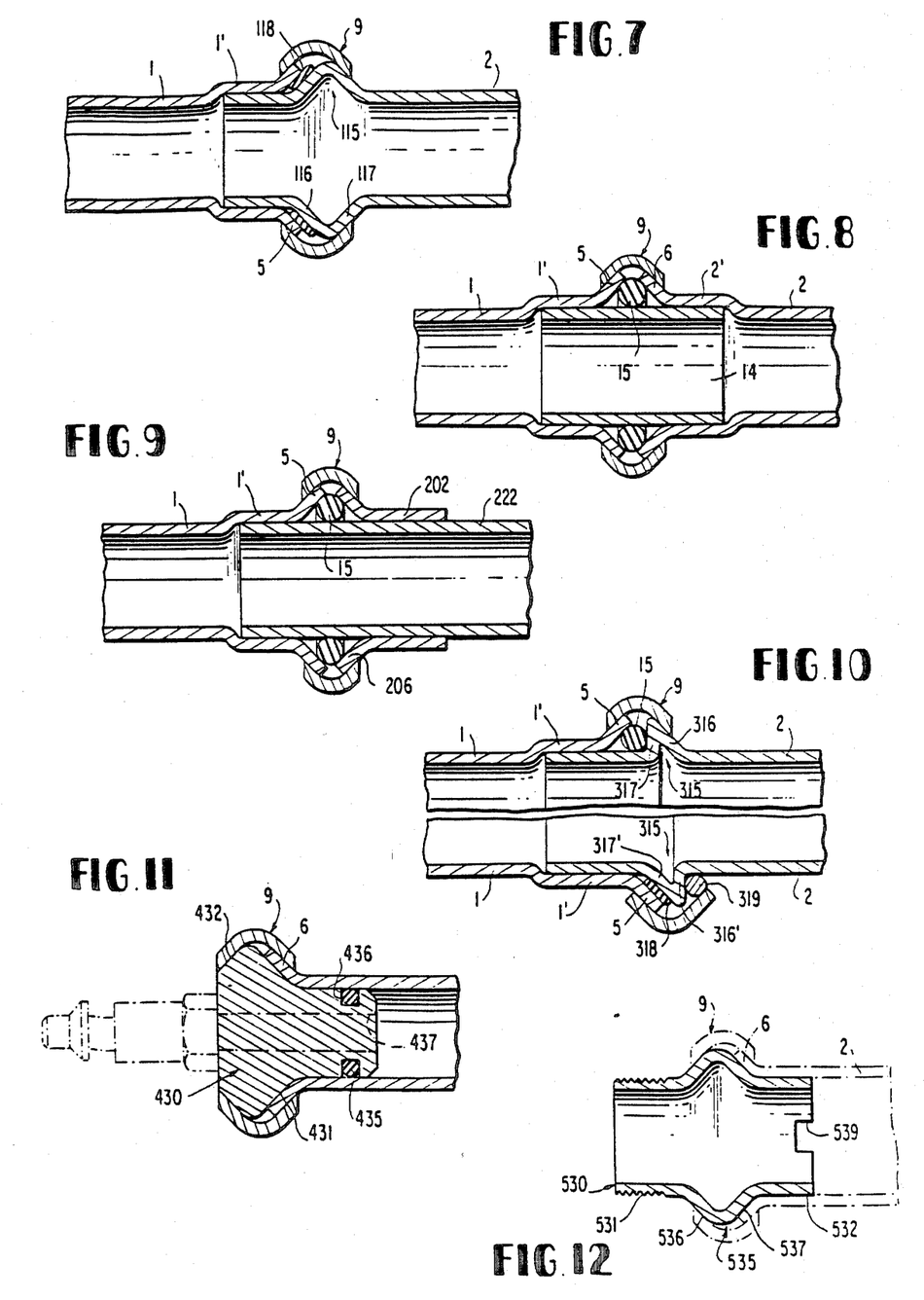
FIG. 7 is a cross-sectional view through still another embodiment of a pipe connection in accordance with the present invention for high temperature applications, in which the short pipe insert section is obviated by providing a bead near one end of a pipe itself.
FIG. 8 is a cross-sectional view through a further modified embodiment of a pipe connection, similar to FIG. 1, in which the pipe ends are flared over predetermined axial lengths to receive within the widened portions a short pipe insert section with an inside diameter corresponding to the full inside diameter of the selected tubing.
FIG. 9 is a cross-sectional view of a pipe connection in accordance with the present invention, similar to FIG. 8, in which instead of widening both pipe ends, a small prefabricated piece of flared tubing is slipped over the unflared tubing.
FIG. 10 is a cross-sectional view through a pipe connection, in accordance with the present invention, in which pipe ends are deformed so as to eliminate the need for a separate pipe insert section.
FIG. 11 is a cross-sectional view illustrating the use of a special plug possibly with a valve to close the pipe end by the use of a pipe connection in accordance with the present invention.
FIG. 12 is a cross-sectional view through a threaded adapter member for use with a pipe connection in accordance with the present invention, utilizing a threaded connecting member.

FIG. 7 differs from FIG. 6 in that the bead 115 with wall portions 116 and 117 is formed in the pipe or tube 2 itself near the free end thereof. The flat gasket-like seal 118 is thereby accommodated between inclined wall portion 116 and flared lip 5 while the clamping ring 9 cooperates with the external surface of flared lip 5 and wall portion 117. This arrangement obviates the need for a separate short pipe insert 114 while the use of the widened portion 1' of pipe or tube 1 again eliminates flow restrictions in the pipe connection of the present invention.

FIG. 8 illustrates the use of widened pipe portions 1' and 2' provided by additionally flaring the pipe end portions to minimize flow losses in a pipe connection according to FIG. 1. As mentioned above in connection with FIG. 6, this arrangement is of advantage where the full inside diameter of the tubing is required without flow restriction. Moreover, this arrangement also assures the proper location of the tube section 14 (FIG. 8) or of the tube section 114 (FIG. 6) within the pipe ends. Hence, the additional costs of flaring the pipe or tube ends to provide the widened portions 1' and 2' can be accepted where this or these features are of sufficient importance.

In the embodiment of FIG. 9, a small prefabricated piece of flared tubing 202 with a flared lip 206 is slipped over and fixed to the unflared tubing 222. This arrangement obviates the need for widening both tube ends by flaring the same, yet again eliminates flow restrictions and obviates the need for a separate pipe insert.

With the use of a rubber-like annular seal 15, it may even be unnecessary to fix the flared tubing 202 onto the unflared tubing 222 since the sealing ring 15, when compressed by the contraction of the clamping ring 9, will exert sufficient frictional force on the tubing 222 to prevent any axial movement thereof relative to tubing 202. While the frictional retention is able to withstand substantial forces, relative axial movement between the parts 202 and 222 can be further prevented, if necessary, for example, by the use of a center punch or pricking tool which may be applied at one or more circumferentially located areas on the tubing 202, thereby indenting the same and also correspondingly indenting the inwardly disposed tubing 222 to provide a detent-type connection. In the alternative, if a still stronger connection is to be established between the two parts 202 and 222, a conventional tube-cutting tool with a rounded-off roller may be used in a conventional manner to produce a circumferential groove simultaneously in both parts 202 and 222.

The arrangement of FIG. 9 is particularly useful, for example, when the tubing 222 is of conventional stock and is to be connected with a flared fitting, for example, a T-shaped fitting with a diameter corresponding to portion 1' and specially made for use with the pipe connection of the present invention.

FIG. 10 illustrates a pipe connection of the present invention for applications requiring larger quantities. In that case, the pipes or tubes 2 are automatically deformed near their ends by conventional means to provide a bead-like projection generally designated by reference numeral 315 which is formed by an inclined wall portion 316, corresponding in its inclination to lip 6 of FIG. 1, and by a generally outwardly extending portion 317 against which the seal 15 abuts reinforcingly. The clamping ring 9 cooperates with the outer surfaces of the flared lip 5 and of the wall portion 316. In the alternative, as shown in the lower half of FIG. 10, a flat gasket-like seal 318 may be interposed between the flared lip 5 and the wall portion 317' of the bead-like projection 315, whereby a wire ring 319 or the like will reinforcingly support the wall portion 316', if required. The clamping ring 9 then cooperates with the outer surface of the flared lip 5 and the supporting wire 319.

FIG. 11 illustrates how a pipe connection in accordance with the present invention can be used to close-off the open end of a pipe or tube by the use of a special plug generally designated by reference numeral 430 which is provided with mutually inclined surfaces 431 and 432, whereby the inner surface of lip 6 cooperates with the outer inclined surface 431 while the clamping ring 9 acts on the outer surface of lip 6 and on the inclined surface 432 of plug member 430. An O-ring 435 is provided in annular groove 436 to provide proper fluid-tightness. Moreover, instead of being solid throughout, the plug member 430 may be provided with a threaded bore 437 to threadably receive a valve of any conventional construction (shown in dash and dotted lines).

FIG. 12 shows a threaded adapter member generally designated by reference numeral 530 to enable a tube or pipe connection in accordance with the present invention with a structural part (not shown) such as a carburetor, provided with a bore having a female thread, into which a threaded nipple is screwed according to the prior art for purposes of connecting thereto a pipe or tube. The adapter member 530 includes an externally threaded section 531 on one side thereof, intended to be screwed into the structural part, an unthreaded section 532 adapted to receive over the same the flared end 6 of a tube 2 (shown in dash and dotted lines) and a bead-like projection generally designated by reference numeral 535 and formed in the adapter member itself by wall portions 536 and 537. The clamping ring 9 thereby cooperates with the outer surface of flared lip 6 and with the outer surface of wall portion 536. To facilitate installation of the adapter member 530 into the structural part, the unthreaded section 532 may be provided with a diametral slot 539 for the insertion of a tool, such as a socket wrench. In practice, the connection of FIG. 12 entails significant savings in cost and weight as well as cost of installation over the prior art connection which involved double flared tube ends, together with connecting nuts and requiring a housing with an internal thread and a special sealing cone on the inside. If the adapter member of the present invention can be brazed onto the structural part or formed integral therwith, e.g., by casting, the connection will be still further simplified.

Figure 13:
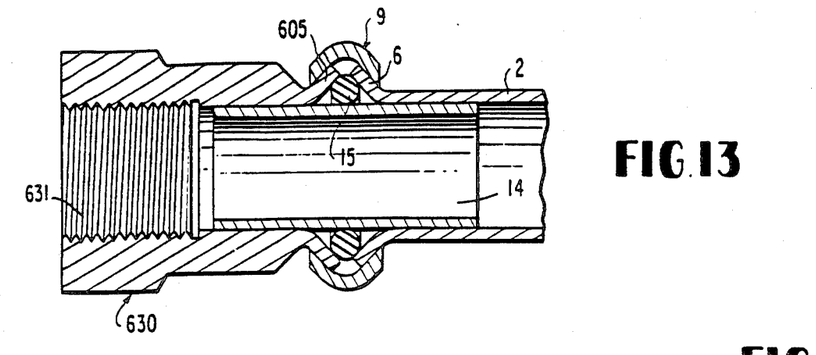
FIG. 13 is a cross-sectional view through a pipe connection in accordance with the present invention utilizing an adapter member provided with a female threaded end.

FIG. 13 illustrates an adapter member generally designated by reference numeral 630 which is provided with a flared lip 605 at one end thereof and with an internally threaded bore portion 631 at the other end thereof. As to the rest, the arrangement is similar to that of FIG. 1.

Figure 14:
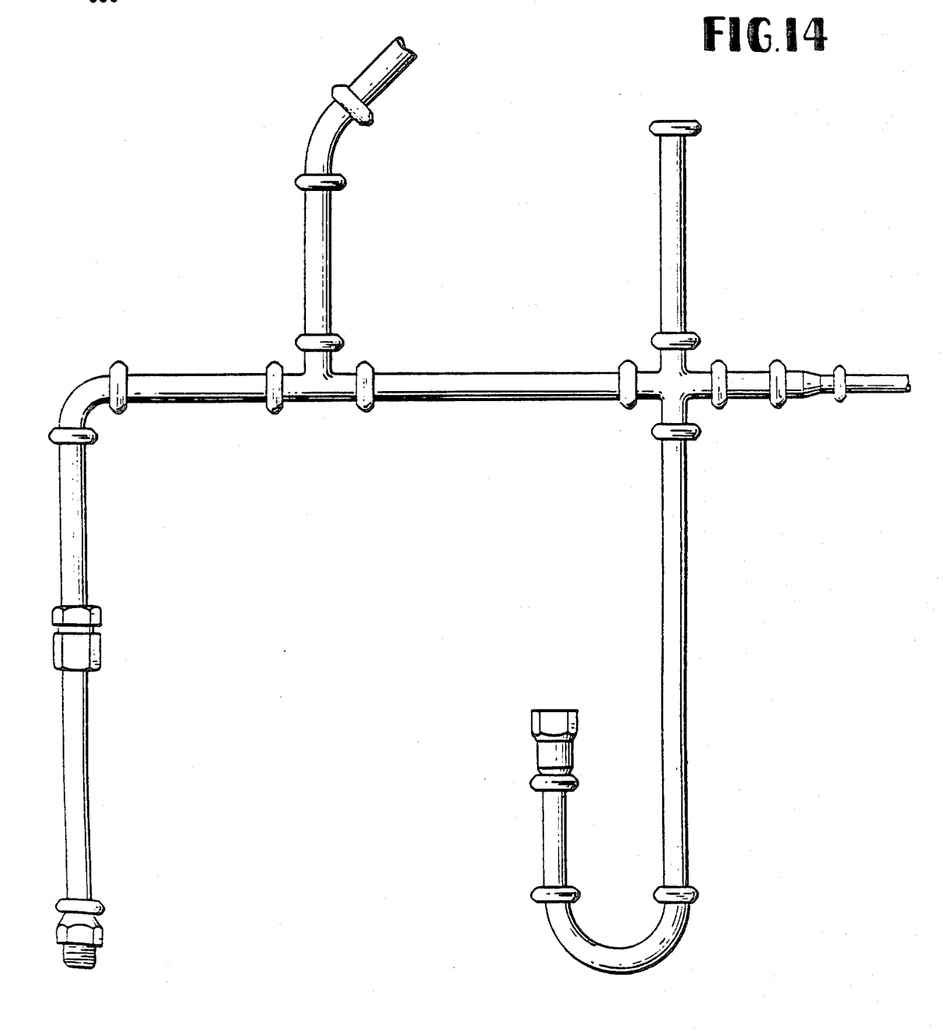
FIG. 14 is a somewhat schematic elevational view illustrating typical applications of pipe connections in accordance with the present invention in a system of interconnected pipes.

FIG. 14 illustrates schematically the multiple uses and possibilities which are feasible with pipe couplings of the present invention, especially with pipe or tube assemblies that are now made available by applicant as standard parts.

Figures 15A, 15B:
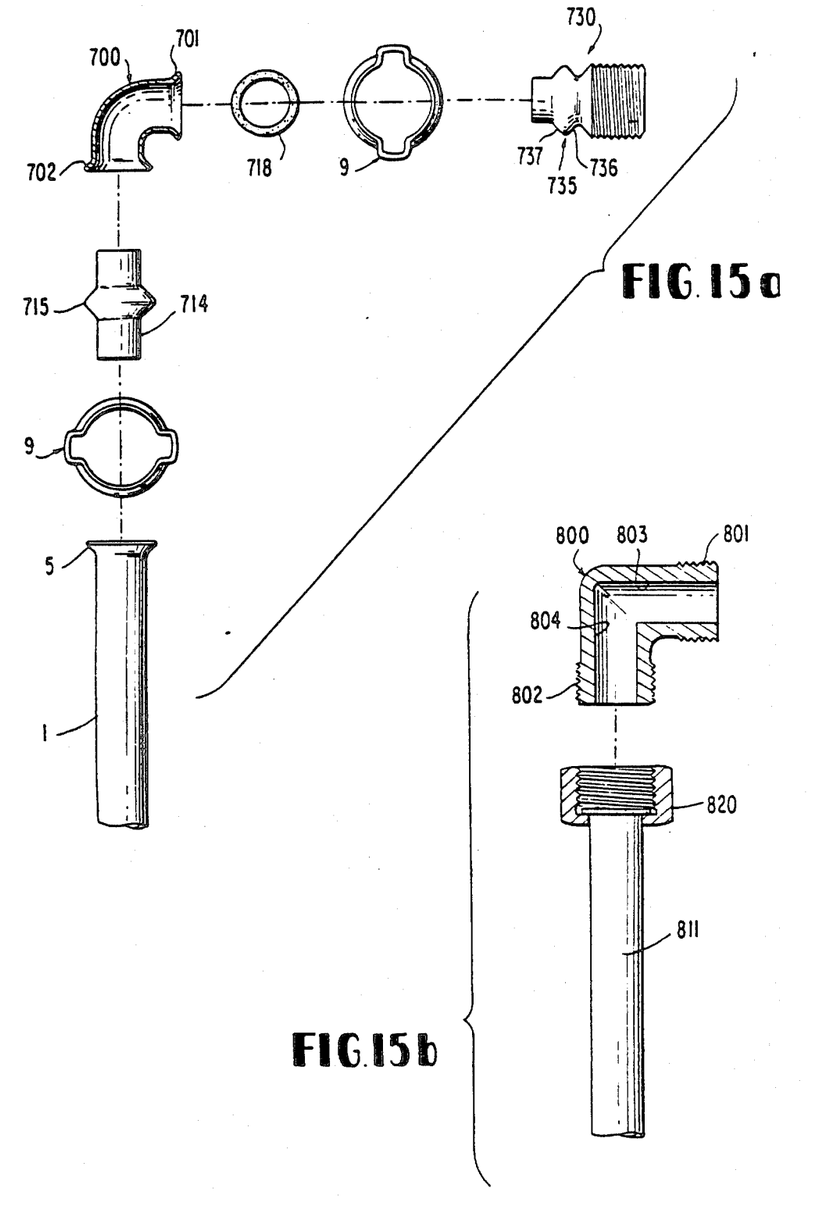
FIG. 15a is an exploded view illustrating an angle fitting in a pipe-connecting system of the present invention and illustrating the advantages realizable thereby over a corresponding prior art angle fitting illustrated in FIG. 15b.

FIG. 15a shows, in exploded view, a pressed angle fitting combined with the connecting system of the present invention. The pressed angle fitting generally designated by reference numeral 700 forms an elbow which subtends an angle of 90° and is provided with flared ends 701 and 702. The flared end 702 is connected with the flared end 5 of tube 1 by the use of a short pipe insert 714 with a seal 715 and by means of the clamping ring 9 (see also FIG. 6). The flared end 701 is connected with the adapter member generally designated by reference numeral 730, which is similar to adapter member 530 of FIG. 12, by the use of clamping ring 9 cooperating with the outer surface of flared lip 701 and with the outer surface 736 of bead-like projection 735, whereby a flat gasket 718 is interposed between the inner surface of flared end 701 and the outer surface 737.

FIG. 15b shows a prior art angle fitting made of machined parts in which the elbow 800 is provided with machined external threads 801 and 802 as well as with bores 803 and 804 intersecting at right angles, for connection with the other parts such as pipe 811 by conventional means such as nut 820. Apart from the much greater weight involved with the arrangement of FIG. 15b, the present angle fitting 700 of FIG. 15a is considerably less expensive and substantially does not interfere with the flow pattern, as contrasted to the angular arrangement of FIG. 15b.

From the foregoing, it is apparent that the clamping ring 9 in the various figures of the drawing is effective to tightly pull together the two parts 1, 2 or 1, 202 or 6, 430 or 6, 530 or 6, 630. The movement of these two parts toward each other is limited in effect in each of the embodiments, for example, in FIG. 1 by the end faces of the flared lips with or without the interposition of a seal 4, in FIG. 3 by the lips 55 and 66, in FIG. 5 by the flared lips 5 and 6 in conjunction with the bead 115, etc.

In summary, the present invention offers a permanent connection which can be easily installed on workbenches, on the wall, in the ceiling or underneath the floor or in any other tight location. Since no torch nor large installation tools are required, the present invention also readily lends itself for installation in the field. Problems arising from remaining moisture in the tubing, which is of utmost concern with soldered joints, are of no significance with the connections of the present invention.

While I have shown and described several embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A pipe connection between a first and a second part, of which at least one part is a tubing means having an axis provided with an inclined wall portion formed by a flared lip extending at an angle to its axis, and of which the other part having an axis and including means near one end thereof providing at least one wall portion inclined at an angle to its axis which is at least approximately similar to said first angle, a short externally cylindrically shaped means internally bridging the connection and extending into said first-mentioned tubing means, and clamping ring means having an annular portion operable to be tightened by contraction in the radially inward direction, said clamping ring means having a ring axis and internal flanks at least partially defining an approximately U-shaped profile at its internal surface thereof in a cross-sectional plane containing the axis of said clamping ring means and substantially parallel thereof, the internal flanks of said clamping ring means being at least approximately complementary to and operable in the contracted condition of the ring means to engage with the inclined wall portions of said first and second part, so that, in the contracted condition of the clamping ring means, the inclined wall portions and therewith the first and second part are urged toward each other, and at least one substantially plastically deformbale lug-shaped ear means in the annular portion of the clamping ring means, said ear means being capable of plastic deformation to thereby tighten the clamping ring means by reducing its diametric dimension and to thereby securely urge the inclined wall portions of said first and second part toward each other to establish a permanent pipe connection safe against unintentional opening and capable of withstanding relatively high pressures and vibrations as well as temperature fluctuations which can be opened again only by destruction of the clamping ring means or its ear means, said U-shaped profile extending over at least the circumference of the annular portion of said clamping ring means, and said short externally cylindrically shaped means being constituted by said second part.

2. A pipe connection according to claim 2, wherein said means near one end of said other part is a bead-like means formed in said short externally, cylindrically shaped means and is defined by mutually inclined wall portions, of which one is at least approximately parallel to the first-mentioned inclined wall portion of said one part and the other is oppositely inclined under an at least approximately equal angle with respect to the tube axis.

3. A pipe connection according to claim 2, wherein the bead-like means is formed in said short externally cylindrically shaped means near one end of the other part which is defined by mutually inclined wall portions at least one of said wall portions of said other part being approximately parallel to said first-mentioned inclined wall portion on said first part.

4. A pipe connection according to claim 3, characterized by flat gasket-like seal means between the inner surface of the first-mentioned inclined wall portion on said first part and the corresponding outer surface of the parallel inclined wall portion of said bead-like means.

5. A pipe connection according to claim 2, further comprising substantially flat gasket-like seal means between said at least approximately parallel inclined wall portions.

6. A pipe connection according to claim 2, wherein the tubing means of said one part is widened over its normal internal diametric dimension to receive therein the tubing means of said other part having substantially said normal internal diametric dimension.

7. A pipe connection according to claim 6, further comprising substantially flat gasket-like seal means between said at least approximately parallel inclined wall portions.

8. A pipe connection according to claim 1, wherein the tubing means of said one part is widened over its normal internal diametric dimension to receive therein the short externally cylindrically shaped means of said other part having substantially said normal internal diametric dimension.

9. A pipe connection according to claim 1, wherein said other part is a plug means having one end fitting into the tubing means of said one part and being provided near the other end thereof with two mutually inclined wall portions, for which one forms said at least one wall portion while the other is generally inclined in the same direction as the inclined wall portion of said one part and cooperates therewith.

10. A pipe connection according to claim 9, wherein a threaded bore means is provided in said plug means for threadably receiving therein a valve means.

11. A pipe connection according to claim 1, wherein the means near the end of said other part is a bead-like means defined by two mutually inclined wall portions.

12. A pipe connection according to claim 11, wherein one of the two last-mentioed mutually inclined wall portions extends generally outwardly, and seal means between the inclined wall portion of said one part and the generally outwardly extending wall portion.

13. A pipe connection according to claim 11, wherein one of said two last-mentioned mutually inclined wall portions is at least approximately parallel to the inclined wall portion of said one part while the other of the two inclined wall portions extends generally outwardly, and flat gasket-line seal means between said at least approximately parallel inclined wall portions.

14. A pipe connection according to claim 13, further comprising ring means on the side of said generally outwardly extending wall portion opposite the inclined wall portion of said bead-like means.

15. A pipe connection according to claim 1, wherein said other part is an adapter member having a threaded portion near one end.

16. A pipe connection according to claim 15, wherein said short externally, cylindrically shaped means is formed by said adapter member, said adapter member including intermediate its ends a bead-like means which has mutually inclined wall portions and forms part of the means near one end of said other part.

17. A pipe connection according to claim 1, wherein said U-shaped profile extends with substantially the same cross section uninterruptedly over the circumference of the clamping ring means, and wherein said ear means is in one piece with the annular portion of said clamping ring means to form an endless ring-like structure.

18. A pipe connection according to claim 1, wherein the annular portion and the ear means of said clamping ring means are made in one piece of substantially the same cross section so that the clamping ring means is devoid of any connection and thus forms a unitary, one-piece endless structure made from the same material.

19. A pipe connection according to claim 1, wherein the clamping ring means including its ear means are made in one piece.

20. A pipe connection according to claim 1, wherein the clamping ring means including its ear means are of substantially similar approximately U-shaped cross section.

21. A pipe connection according to claim 1, wherein said ear means has an apex portion and reinforcing means within the area of said apex portion.

22. A clamping ring according to claim 21, wherein the reinforcing means includes an indentation within the apex area.

23. A clamping ring according to claim 22, wherein said indentation has an approximately elliptical shape extending in the direction of the circumference of the clamping ring means.

24. A clamping ring according to claim 23, wherein said indentation extends in the circumferential direction to a greater extent than in the pipe axial direction.

25. A clamping ring according to claim 21, wherein said reinforcing means is formed by an approximately U-shaped cross section within the apex area.

26. A clamping ring according to claim 22, wherein said indentation is of approximately circular shape.

* * * * *